US012679437B2

(12) United States Patent
Hu

(10) Patent No.: US 12,679,437 B2
(45) Date of Patent: Jul. 14, 2026

(54) FOLDABLE AND MOVABLE CARRIER

(71) Applicant: Wonderland Switzerland AG,
Steinhausen (CH)

(72) Inventor: Shoufeng Hu, Dongguan (CN)

(73) Assignee: **WONDERLAND SWITZERLAND
AG**, Steinhausen (CH)

( * ) Notice: Subject to any disclaimer, the term of this
patent is extended or adjusted under 35
U.S.C. 154(b) by 346 days.

(21) Appl. No.: 18/292,473

(22) PCT Filed: Aug. 10, 2022

(86) PCT No.: PCT/EP2022/072436
§ 371 (c)(1),
(2) Date: Jan. 26, 2024

(87) PCT Pub. No.: WO2023/017076
PCT Pub. Date: Feb. 16, 2023

(65) Prior Publication Data
US 2024/0375699 A1      Nov. 14, 2024

(30) Foreign Application Priority Data
Aug. 10, 2021      (CN) .......................... 202110915281.3

(51) Int. Cl.
*B62B 7/08* (2006.01)

(52) U.S. Cl.
CPC ............ *B62B 7/08* (2013.01); *B62B 2205/20*
(2013.01)

(58) Field of Classification Search
CPC .. B62B 7/08; B62B 7/06; B62B 7/062; B62B
7/064; B62B 9/12; B62B 9/20; B62B
2205/20
See application file for complete search history.

(56) References Cited

U.S. PATENT DOCUMENTS 9,174,661  B2 *  11/2015  Li ............................. B62B 7/10
10,059,359  B2 *  8/2018  Reichardt ................. B62B 7/08
(Continued)

FOREIGN PATENT DOCUMENTS

CN          106143575 A       11/2016
CN          206217964 U        6/2017
(Continued)

OTHER PUBLICATIONS

AU Office Action; Examination report No. 1; Application No.
2022325475; Date Mailed: Apr. 30, 2025; pp. 1-7.
(Continued)

*Primary Examiner* — John D Walters
(74) *Attorney, Agent, or Firm* — CANTOR COLBURN
LLP

(57)          ABSTRACT
A foldable and movable carrier includes a locking mecha-
nism, a first rod, and a second rod. The locking mechanism
has a locked state and an unlocked state. The first rod is
provided with a first mating portion. The second rod is
pivotally connected to the first rod, and the second rod is
provided with a second mating portion detachably mating
with the first mating portion. When the locking mechanism
is in the locked state, the first rod and the second rod are
relatively fixed. When the locking mechanism is in the
unlocked state, if the first mating portion mates with the
second mating portion, the first rod and the second rod are
relatively fixed, if the first mating portion and the second
mating portion are released from mating, the first rod is
capable of rotating relative to the second rod, so as to fold
or unfold the movable carrier.

20 Claims, 5 Drawing Sheets

(56)                References Cited

U.S. PATENT DOCUMENTS

| | | | | |
|---|---|---|---|---|
| 11,912,328 | B2 * | 2/2024 | Li | ............................ B62B 7/08 |
| 2014/0145417 | A1 | 5/2014 | Li | |
| 2017/0072981 | A1 | 3/2017 | Reichardt et al. | |
| 2020/0216108 | A1 | 7/2020 | Li | |

FOREIGN PATENT DOCUMENTS

| | | |
|---|---|---|
| CN | 107985379 A | 5/2018 |
| CN | 208530667 U | 2/2019 |
| CN | 208963151 U | 6/2019 |
| CN | 110733553 A | 1/2020 |
| CN | 215475320 U | 1/2022 |
| CN | 108909813 B | 7/2023 |
| EP | 2636571 A2 | 9/2013 |
| EP | 3632771 A1 | 4/2020 |
| GB | 2555751 A | 5/2018 |
| JP | 2020519530 A | 7/2020 |
| KR | 1020080067580 A | 7/2008 |
| TW | 250041 U | 6/1995 |
| WO | 2021140045 A2 | 7/2021 |

OTHER PUBLICATIONS

CN First Office Action with English Translation; CN Application No. 202110915281.3; dated Apr. 9, 2025; pp. 1-9.

JP Decision to Grant w English Translation; JP Application No. 2024-508343; Date Mailed: Mar. 25, 2025; pp. 1-5.

International Search Report for International Application No. PCT/EP2022/072436; International Filing Date: Aug. 10, 2022; Date of Mailing: Nov. 18, 2022; 3 pages.

Taiwanese Application No. 111130018; First Office Action with English Translation dated Mar. 7, 2023; 11 pages.

Written Opinion for International Application No. PCT/EP2022/072436; International Filing Date: Aug. 10, 2022; Date of Mailing: Nov. 18, 2022; 5 pages.

* cited by examiner

FOLDABLE AND MOVABLE CARRIER

CROSS-REFERENCE TO RELATED APPLICATIONS

This application is an U.S. national phase application under 35 U.S.C. § 371 based upon international patent application No. PCT/EP2022/072436, filed on Aug. 10, 2022, which itself claims priority to China patent application No. 2021109152813, filed on Aug. 10, 2021, the content of which is hereby incorporated by reference in its entirety.

TECHNICAL FIELD

The present disclosure relates to the technical field of carriers, in particular to a foldable and movable carrier.

BACKGROUND

Rotatable and foldable carriers, such as foldable strollers, are easy to store and carry, but are also prone to potential safety hazards. According to the test requirements of the European Regulation EN1888-1:2018 (8.3.5.1 Test Standard for Folding System for Ease of storage or transportation), there shall be at least two separate and independent manual operating devices which fulfil the following conditions: where any one of the operating devices is released, it shall also automatically return to its original status and the locking device shall relock again. However, in the current stroller on the market, when, for example, a locking mechanism on a handle of the stroller is unintentionally pressed, the handle will pivot to a certain extent under the action of the child's weight or its own gravity, so that the locking mechanism cannot return to a locked position, causing certain safety hazards to the children in the stroller.

SUMMARY

Accordingly, a foldable and movable carrier is provided, which can prevent pivoting of the carrier after unintentional release of a locking mechanism, so as to facilitate the relocking and refixing of the movable carrier.

According to an aspect of the present disclosure, a foldable and movable carrier is provided, and includes:

a locking mechanism having a locked state and an unlocked state;

a first rod provided with a first mating portion; and a second rod pivotally connected to the first rod, and the second rod being provided with a second mating portion detachably mating with the first mating portion;

wherein when the locking mechanism is in the locked state, the first rod and the second rod are relatively fixed. When the locking mechanism is in the unlocked state, if the first mating portion mates with the second mating portion, the first rod and the second rod are relatively fixed, if the first mating portion and the second mating portion are released from mating, the first rod is capable of rotating relative to the second rod, so as to fold or unfold the movable carrier.

In the foldable and movable carrier, when the locking mechanism is unintentionally unlocked, since the first mating portion and the second mating portion are in a mating state, the first rod pivotally connected to the second rod will not pivot, so that the user can reset the locking mechanism, and thus the first rod can be restored to the locked state, and as a result, the safety of the entire foldable and movable carrier can be improved. In addition, when it is really necessary to release the locking, the locking mechanism can be pressed, and the first mating portion and the second mating portion can be released from the mating, for example, by applying a certain external force, so that the first rod can rotate and be folded relative to the second rod, to ensure the realization of the foldable function of the movable carrier.

In one of the embodiments, the first mating portion is a male connecting portion, and the second mating portion is a female connecting portion capable of detachably mating with the male connecting portion. Or, the first mating portion is a female connecting portion, and the second mating portion is a male connecting portion capable of detachably mating with the female connecting portion.

In one of the embodiments, one of the first mating portion and the second mating portion is an engaging groove; another one of the first mating portion and the second mating portion is an engaging protrusion capable of being engaged with the engaging groove.

In one of the embodiments, the engaging groove is a V-shaped groove. The V-shaped groove includes a first groove wall and a second groove wall that are arranged in a V shape. The engaging protrusion is an arc-shaped protrusion capable of being tangent to the first groove wall and the second groove wall.

In one of the embodiments, an included angle between the first groove wall and a plane where an opening of the V-shaped groove is located is in a range from 40° to 50°. An included angle between the second groove wall and the plane where the opening of the V-shaped groove is located is in a range from 40° to 50°. A height of the arc-shaped protrusion is in a range from 1.5 mm to 2.5 mm.

In one of the embodiments, the engaging protrusion is a serrated protrusion including at least two engaging teeth. The engaging groove is a serrated groove including at least two engaging grooves. The at least two engaging teeth are capable of mating with the at least two engaging grooves one by one.

In one of the embodiments, one of the first mating portion and the second mating portion is a plug hole; and another one of the first mating portion and the second mating portion is a plug pin capable of being plugged into the plug hole.

In one of the embodiments, a hole wall of the plug hole is capable of being elastically deformed; when the hole wall of the plug hole is elastically deformed, an inner diameter of the plug hole is greater than a diameter of the plug pin; when the hole wall of the plug hole is restored to its original shape, the inner diameter of the plug hole is less than the diameter of the plug pin. Or, the plug pin is capable of being elastically deformed; when the plug pin is elastically deformed, a diameter of the plug pin is less than an inner diameter of the plug hole; and when the plug pin is restored to its original state, the diameter of the plug pin is greater than the inner diameter of the plug hole.

In one of the embodiments, the foldable and movable carrier further includes a third rod. The first rod includes a first position, a second position, and a third position that are sequentially spaced apart in an extending direction of the first rod. The first mating portion is disposed in the third position. The third rod is pivotally connected to the first rod in the first position through the locking mechanism. When the locking mechanism is in the locked state, the first rod and the third rod are relatively fixed. When the locking mechanism is in the unlocked state, the first rod is capable of rotating relative to the third rod, so as to fold or unfold the movable carrier. The second rod is pivotally connected to the first rod in the second position.

In one of the embodiments, an end of the first rod is provided with a first rotating sector. An end of the second rod is provided with a second rotating sector. The first rotating sector is opposite to the second rotating sector. The second position is disposed at a circle center of the first rotating sector. A circle center of the second rotating sector is pivotally connected to the first rotating sector in the second position. The first mating portion is disposed at a circumferential edge of a surface of the first rotating sector facing the second rotating sector. The second mating portion is disposed at a circumferential edge of a surface of the second rotating sector facing the first rotating sector.

In one of the embodiments, a stopper is disposed on a side of the second rotating sector close to the third rod. When the first rod and the second rod are relatively fixed, the first rotating sector abuts against the stopper.

In one of the embodiments, the locking mechanism includes:

a first locking shell fixed on the first rod and including a first locking groove;

a second locking shell fixed on the third rod and including a second locking groove;

a locking member including at least two locking teeth arranged at a predetermined angle, wherein shapes of the first locking groove and the second locking groove are adapted to a shape of the locking member, the locking member has a locked state and an unlocked state; when the locking member is in the locked state, the locking member is arranged in both the first locking shell and the second locking shell to limit a rotation of the second locking shell relative to the first locking shell; when the locking member is in the unlocked state, the locking member is withdrawn from the first locking groove or the second locking groove to allow the second locking shell to rotate relative to the first locking shell;

an elastic member operably connected to the locking member, so as to maintain the locking member in the locked state; and a releasing member operably connected to the locking member, so as to drive the locking member to move against elastic force of the elastic member to switch the locking member from the locked state to the unlocked state.

100, first rod; 101, first mating portion; 110, first position; 120, second position; 130, third position; 140, first rotating sector; 141, arc-shaped guiding groove; 150, engaging groove; 151, first groove wall; 152, second groove wall; 200, third rod; 300, second rod; 301, second mating portion; 310, second rotating sector; 311, arc-shaped guiding rib; 312, stopper; 320, engaging protrusion; 400, locking mechanism; 410, first locking shell; 411, first locking groove; 420, elastic member; 430, locking member; 431, locking teeth; 440, second locking shell; 441, through hole; 442, second locking groove; 450, releasing member; 451, pushing portion; 20, handle; 30, front support; 40, rear support.

DETAILED DESCRIPTION OF THE EMBODIMENTS

Figure 1:
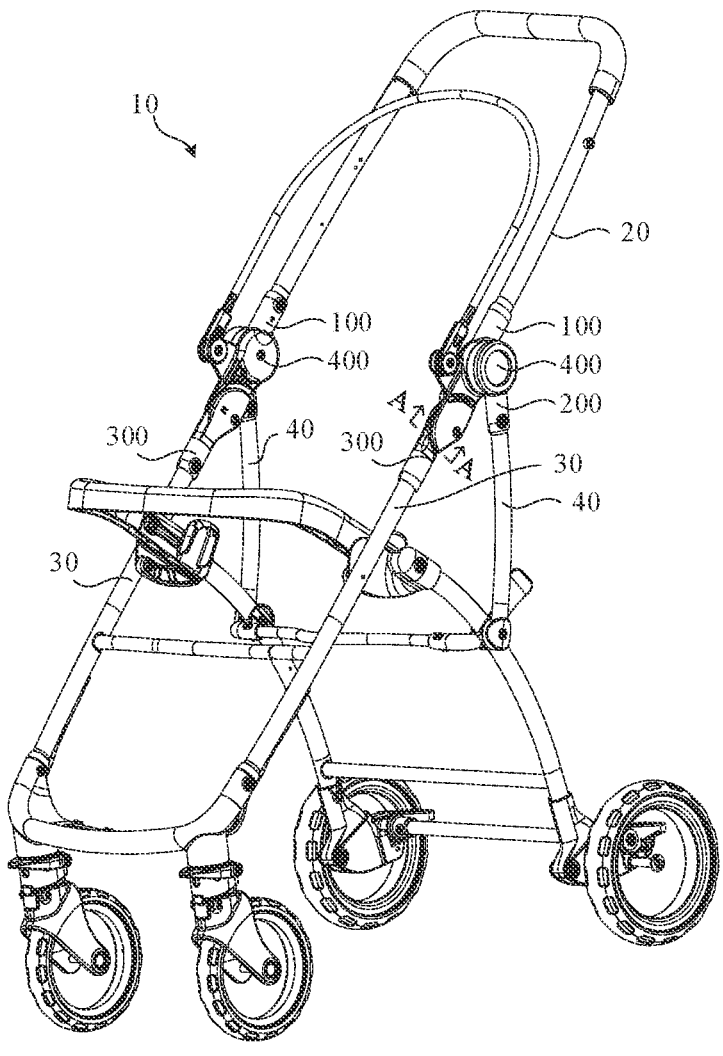
FIG. 1 is a perspective schematic view of a movable carrier according to an embodiment of the present disclosure, wherein the movable carrier is in a locked and fixed state.
Figure 2:
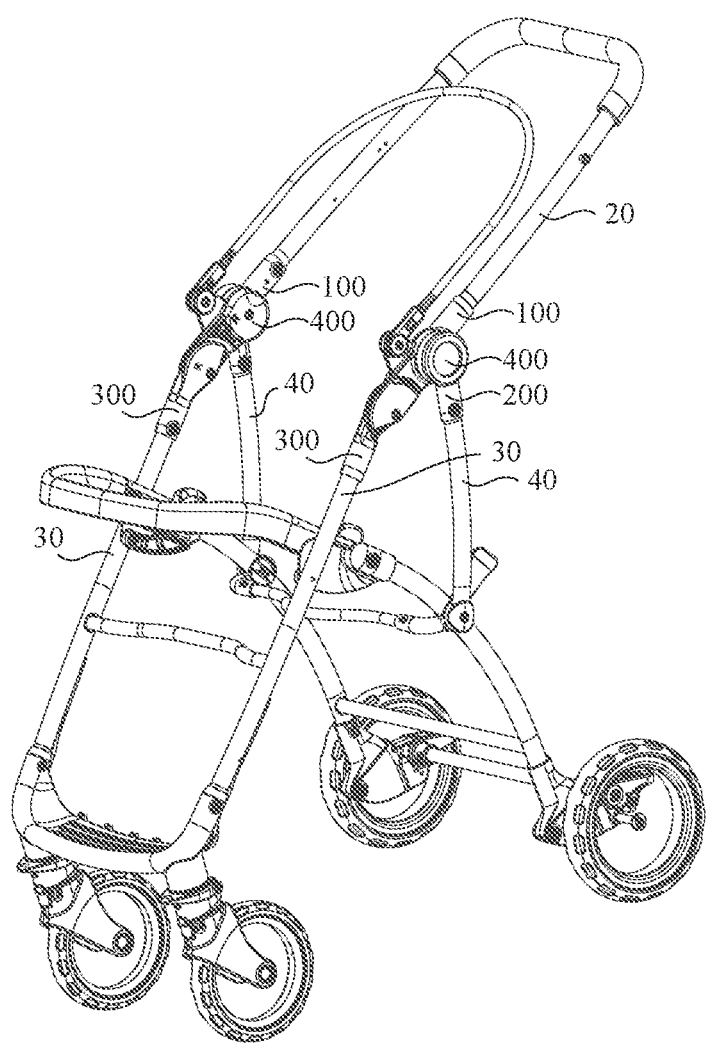
FIG. 2 is a perspective schematic view of a movable carrier according to an embodiment of the present disclosure, wherein the movable carrier is in an unlocked and rotatable state.

As shown in FIGS. 1 to 2, an embodiment of the present disclosure provides a foldable and movable carrier. The foldable and movable carrier includes a first rod 100, a third rod 200, and a second rod 300. In this embodiment, the carrier may be a stroller. The stroller includes a handle 20, a front support 30, and a rear support 40. In this embodiment, the first rod 100, the third rod 200, and the second rod 300 are all hollow rods, and are respectively sleeved on an end of the handle 20, an end of the rear support 40, and an end of the front support 30. Certainly, in other embodiments, the first rod 100, the third rod 200, and the second rod 300 may also be connected to the handle 20, the rear support 40, and the front support 30 by other means, respectively. Or, the first rod 100, the third rod 200, and the second rod 300 are formed as a part of the handle 20, a part of the rear support 40, and a part of the front support 30, respectively. In a word, the present disclosure can be achieved as long as movements of the first rod 100, the third rod 200, and the second rod 300 can drive the handle 20, the front support 30, and the rear support 40 to move accordingly. The foldable and movable carrier 10 can prevent the handle 20 of the stroller from pivoting after a locking mechanism 400 is unintentionally released, so that the stroller can be relocked, and the safety performance of the stroller can be improved.

Figure 7:
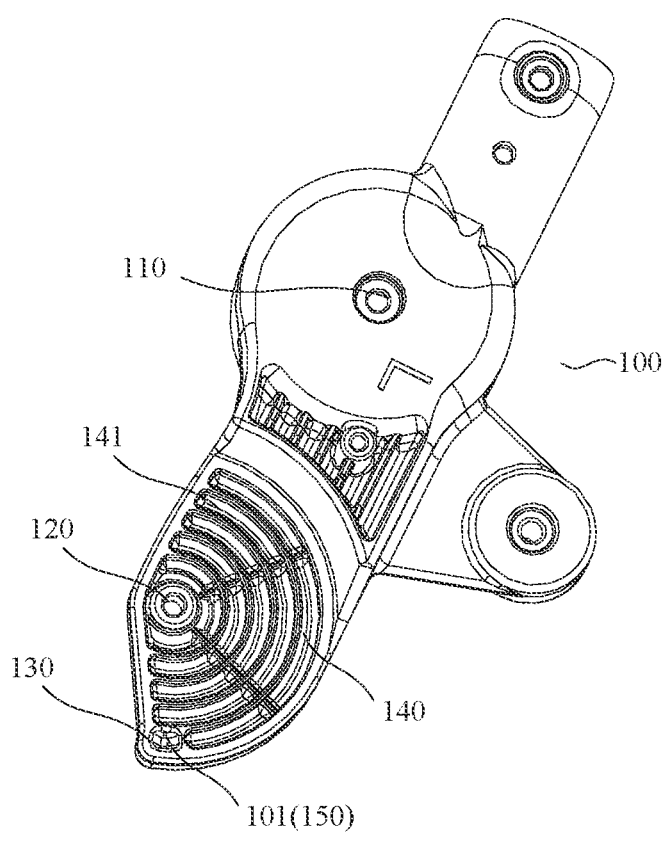
FIG. 7 is a perspective schematic view of a first rod of the movable carrier of FIG. 1.

Specifically, as shown in FIGS. 2 and 7, the first rod 100 includes a first position 110, a second position 120, and a third position 130 which are sequentially spaced apart in an extending direction of the first rod 100. It should be noted that the structure of the movable carrier of the present disclosure is not limited to herein. In this embodiment, the first rod 100 is sleeved on a bottom end of the handle 20. Certainly, the first rod 100 can also be connected to the bottom end of the handle 20 or be formed as a part of the bottom end of the handle 20. A first mating portion 101 is disposed in the third position 130.

The third rod 200 is pivotally connected to the first rod 100 in the first position 110 through the locking mechanism 400. The locking mechanism 400 has a locked state and an unlocked state. When the locking mechanism 400 is in the locked state, the first rod 100 and the third rod 200 are relatively fixed and arranged at a first preset included angle. When the locking mechanism 400 is in the unlocked state, the first rod 100 can rotate relative to the third rod 200. In this embodiment, the third rod 200 is sleeved on a top end of the rear support 40. Certainly, the third rod 200 can also be connected to the top end of the rear support 40 or be formed as a part of the top end of the rear support 40 by other means. In this embodiment, the first preset included angle is an acute angle.

Figure 4:
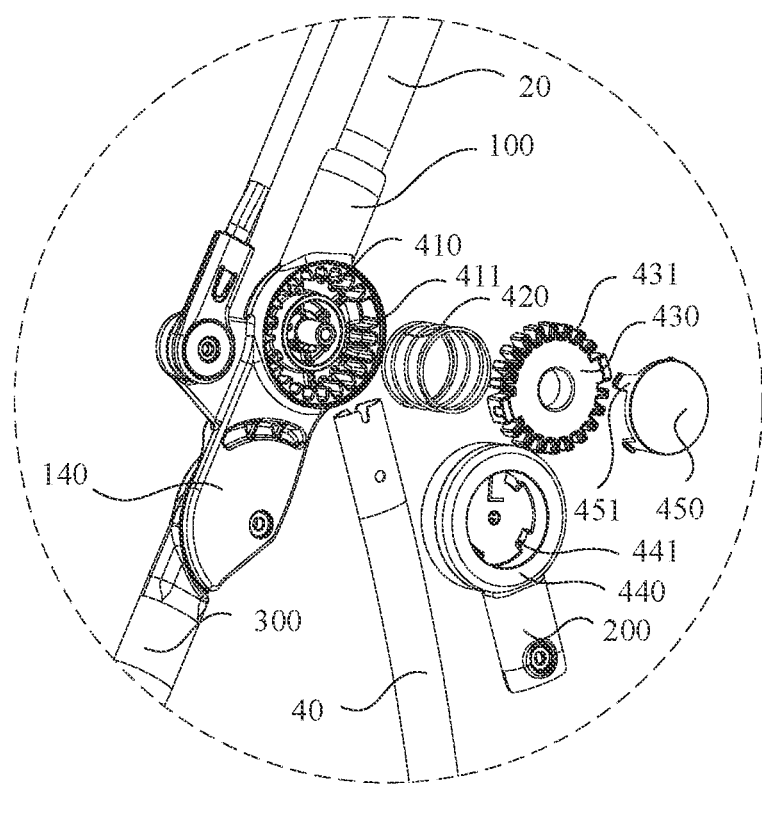
FIG. 4 is a partial exploded view of the movable carrier of FIG. 1 from a perspective.
Figure 5:
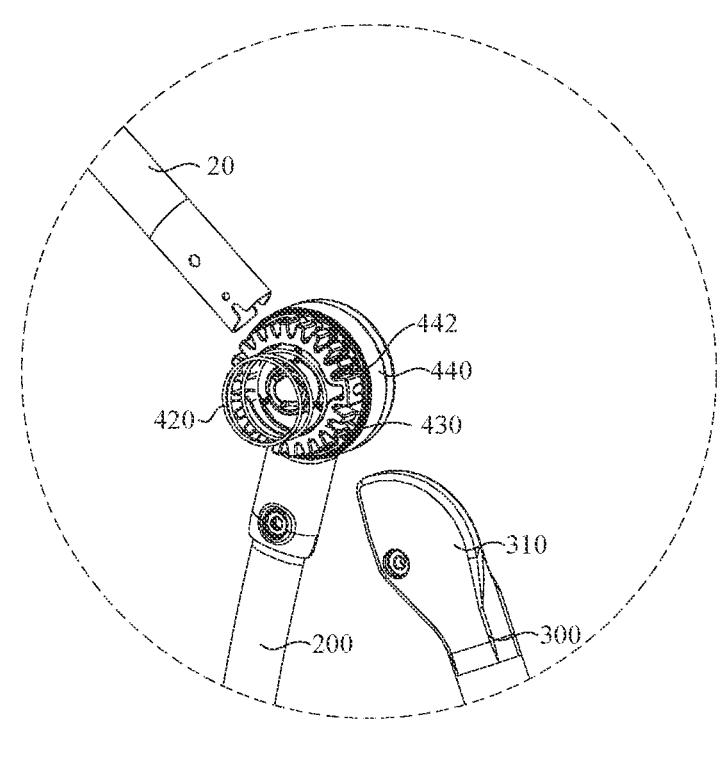
FIG. 5 is a partial exploded view of the movable carrier of FIG. 1 from another perspective.
Figure 6:
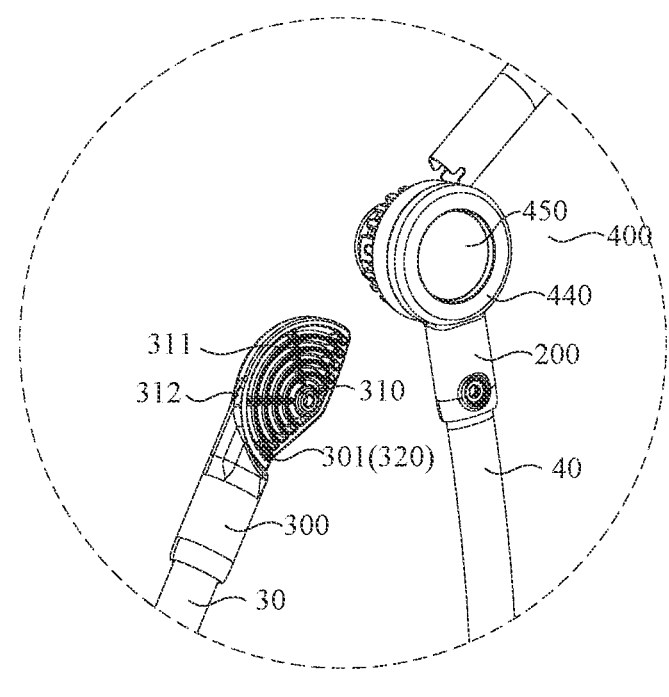
FIG. 6 is a partial exploded view of the movable carrier of FIG. 1 from yet another perspective.

In this embodiment, as shown in FIGS. 4 to 6, the locking mechanism 400 includes a first locking shell 410, an elastic member 420, a locking member 430, a second locking shell 440, and a releasing member 450, which are arranged in sequence. The first locking shell 410 is fixed on the first rod 100 or is a part of the first rod 100. The first locking shell 410 includes a first locking groove 411. The second locking shell 440 is fixed on the third rod 200, or is formed as a part of the third rod 200. The second locking shell 440 includes a second locking groove 442. The locking member 430 includes at least two locking teeth 431 arranged at a predetermined angle. Shapes of the first locking groove 411 and the second locking groove 442 are both adapted to a shape of the locking member 430. In this embodiment, the locking member 430 is a gear-shaped locking member 430. The first locking groove 411 and the second locking groove 442 are both gear-shaped locking grooves mating with the gear-shaped locking member 430. The locking member 430 has a locked state and an unlocked state. When the locking member 430 is in the locked state, the locking member 430 is arranged in both the first locking shell 410 and the second locking shell 440 to limit the rotation of the second locking shell 440 relative to the first locking shell 410. When the locking member 430 is in the unlocked state, the locking member 430 is withdrawn from the first locking groove 411 or the second locking groove 442 to allow the second locking shell 440 to rotate relative to the first locking shell 410. The elastic member 420 is operably connected to the locking member 430, for maintaining the locking member 430 in the locked state. In this embodiment, the elastic member 420 is a spring. Two ends of the spring abut against the first locking shell 410 and the locking member 430, respectively. The releasing member 450 is operably connected to the locking member 430, for driving the locking member 430 to move against the elastic force of the elastic member 420 to switch the locking member 430 from the locked state to the unlocked state. In this embodiment, the releasing member 450 is a release button. The release button is provided with a pushing portion 451. The second locking shell 440 is provided with a through hole 441 through which the pushing portion 451 can pass.

In this way, when the releasing member 450 is not pressed, and when the locking member 430 is in the locked state, the locking member 430 is locked into both the first locking shell 410 and the second locking shell 440 under the elastic force of the elastic member 420 that is a return spring. In this case, the first locking shell 410 and the second locking shell 440 are in the locked state, that is, the first rod 100 and the third rod 200 are in the locked state. When the releasing member 450 is pressed, the pushing portion 451 can pass through the through hole 441 to press the second locking shell 440 and the locking member 430, so that the locking member 430 is separated from the first locking groove 411 or the second locking groove 442. In this case, the first locking shell 410 and the second locking shell 440 are in the released state, that is, the first rod 100 can rotate relative to the third rod 200. The locking mechanism 400 has a simple structure and can enable the first rod 100 and the third rod 200 to switch between the locked state and the unlocked state. However, when the releasing member 450 is unintentionally pressed, the first rod 100 will pivot under the action of external force or its own gravity, so that the locking teeth 431 of the locking member 430 are misaligned with the first locking groove 411 or the second locking groove 442, so that it is difficult for the locking member 430 to reengage into the first locking groove 411 or the second locking groove 442 such that the first locking shell 410 and the second locking shell 440 are difficult back to the locked state again. That is, it is difficult to bring the first rod 100 and the third rod 200 into a relatively locked and fixed state again.

The second rod 300 is pivotally connected to the first rod 100 in the second position 120. The second rod 300 is provided with a second mating portion 301 detachably mating with the first mating portion 101. When the first mating portion 101 mates with the second mating portion 301, the first rod 100 and the second rod 300 are relatively fixed and arranged at a second preset included angle. When the first mating portion 101 and the second mating portion 301 are released from mating, the first rod 100 can rotate relative to the second rod 300, and an included angle facing the third rod 200, between the first rod 100 and the second rod 300 is less than or equal to the second preset included angle. In this embodiment, the second preset included angle is 180 degrees. In this way, when the first mating portion 101 mates with the second mating portion 301, the first rod 100 and the second rod 300 are on the same straight line. In addition, since the first preset included angle is an acute angle, when the locking mechanism 400 is in the locked and fixed state, a combined structure of the first rod 100 and the second rod 300, and the third rod 200 form a triangular support structure. Furthermore, because the included angle facing the third rod 200, between the first rod 100 and the second rod 300 is always kept less than or equal to the second preset included angle, that is, when the locking mechanism 400 is in the locked state, the first rod 100 can neither rotate along the direction from the third rod 200 to the second rod 300 nor along the direction from the second rod 300 to the third rod 200. Therefore, when the locking mechanism 400 is in the locked state, the first rod 100 and the second rod 300 can be kept at the second preset included angle, thereby providing a stable triangular support structure for the whole stroller.

In this way, when the locking mechanism 400 is in the locked state, the first rod 100, the second rod 300, and the third rod 200 form a stable triangular support structure, so that the first rod 100 and the second rod 300 are relatively fixed, and the first rod 100 and the third rod 200 are also relatively fixed. When the locking mechanism 400 is unintentionally pressed and unlocked, since the first mating portion 101 which mates with the second mating portion 301 of the second rod 300 is disposed in the third position 130 of the first rod 100, the first mating portion 101 mates with the second mating portion 301, the first rod 100 and the second rod 300 are still relatively fixed, and the first rod 100 will not pivot. In this way, the first rod 100 can be prevented from pivoting in a state of unintentional release such that the locking mechanism 400 cannot be restored to the locked state, and the first rod 100 and the second rod 300 cannot be locked and fixed. When the foldable and movable carrier 10 needs to be folded, the locking mechanism 400 is unlocked, and a certain external force is applied to the first rod 100 at the same time, so that the first mating portion 101 and the second mating portion 301 are released from mating. In this way, the relative fixed state among the first rod 100, the third rod 200, and the second rod 300 can be released, and the foldable and movable carrier 10 can be folded.

In an embodiment, as shown in FIGS. 4 to 7, a bottom end of the first rod 100 is provided with a first rotating sector 140, a top end of the second rod 300 is provided with a second rotating sector 310. The second position 120 is disposed at a circle center of the first rotating sector 140. A circle center of the second rotating sector 310 is pivotally connected to the first rotating sector 140 in the second position 120 (i.e., the circle center of the first rotating sector 140). A surface of the first rotating sector 140 facing the second rotating sector 310 is provided with at least two arc-shaped guiding grooves 141 that are concentric with the first rotating sector 140. A surface of the second rotating sector 310 facing the first rotating sector 140 is provided with at least two arc-shaped guiding ribs 311 that are concentric with the second rotating sector 310. The arc-shaped guiding ribs 311 mates with the arc-shaped guiding grooves 141 in one-to-one correspondence, to guide the rotations of the first rod 100 and the second rod 300, to facilitate the folding of the movable carrier. It can be understood that the locations of the arc-shaped guiding grooves 141 and the locations of the arc-shaped guiding ribs 311 can be interchanged.

In an embodiment, as shown in FIGS. 6 and 7, the first mating portion 101 is disposed at a circumferential edge of the surface of the first rotating sector 140 facing the second rotating sector 310, and the second mating portion 301 is disposed at a circumferential edge of the surface of the second rotating sector 310 facing the first rotating sector 140. In this way, a distance from the second position 120 to the third position 130 is relatively large. According to the lever principle, when the movable carrier is folded, the external force required to be applied to release the mating between the first mating portion 101 and the second mating portion 301 is smaller, which means that less effort is required when the movable carrier is folded. Certainly, the locations of the first mating portion 101 and the second mating portion 301 can also be arranged according to actual needs. For example, the first mating portion 101 and the second mating portion 301 can be arranged closer to the circle center of the first rotating sector 140 and the circle center of the second rotating sector 310, respectively, so that when the locking mechanism 400 is unintentionally released, the first rod 100 is more difficult to pivot, etc., which is not limited to herein.

Further, a stopper 312 is disposed on a side of the second rotating sector 310 close to the third rod 200. When the first rod 100 and the second rod 300 are arranged at the second preset included angle, the first rotating sector 140 abuts against the stopper 312. The stopper 312 may be a stopping protrusion, a stopping slope, or the like. In this embodiment, the stopper 312 is a stopping slope disposed at the circumferential edge of the surface of the second rotating sector 310 facing the first rotating sector 140, and the stopping slope is gradually raised in a direction of approaching the third rod 200. In this way, it can be ensured that the included angle facing the third rod 200, between the first rod 100 and the second rod 300 is always less than or equal to the second preset included angle.

Optionally, the first mating portion 101 is a male connecting portion, and the second mating portion 301 is a female connecting portion that can detachably mate with the male connecting portion. Or, the first mating portion 101 is a female connecting portion, and the second mating portion 301 is a male connecting portion that can detachably mate with the female connecting portion.

In an embodiment, as shown in FIGS. 6 and 7, the first mating portion 101 is an engaging groove 150, and the second mating portion 301 is an engaging protrusion 320 capable of being engaged with the engaging groove 150. In this way, when the locking mechanism 400 is unintentionally unlocked, since the engaging protrusion 320 of the second rod 300 is engaged into the engaging groove 150 of the first rod 100, the first rod 100 is not easy to pivot under the action of external force or its own gravity, so that the locking mechanism 400 can be restored to the locked state again, and thus the movable carrier can be relocked and refixed. When the movable carrier needs to be folded, it is only necessary to apply a certain external force on the first rod 100 to make the engaging protrusion 320 rotate out from the engaging groove 150, which ensures the foldable function of the movable carrier. It can be understood that the first mating portion 101 can also be the engaging protrusion 320, and the second mating portion 301 can be the engaging groove 150 capable of being engaged with the engaging protrusion 320.

In this embodiment, the engaging groove 150 is disposed on the circumferential edge of the surface of the first rotating sector 140 facing the second rotating sector 310, and the engaging protrusion 320 is disposed on the circumferential edge of the surface of the second rotating sector 310 facing the first rotating sector 140. Certainly, in other embodiments, the engaging groove 150 may also be disposed in other positions of the first rotating sector 140, and the engaging protrusion 320 may also be disposed in other positions of the second rotating sector 310.

Figure 3:
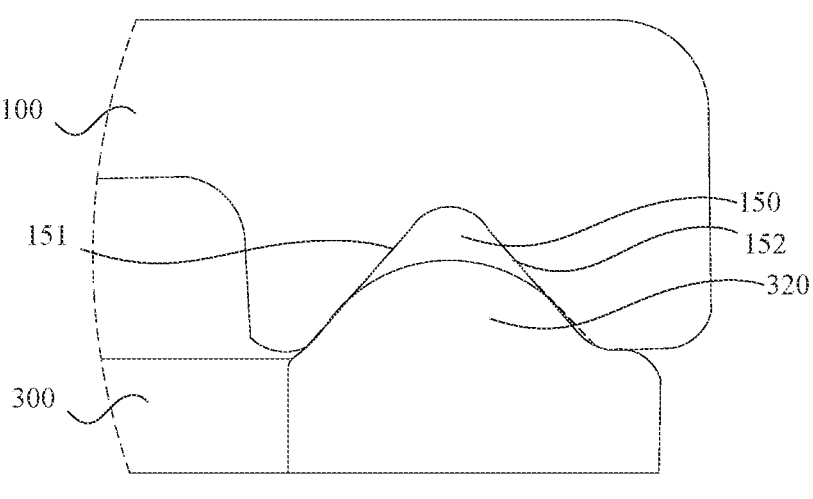
FIG. 3 is a cross-sectional view taken along a line A-A of FIG. 1.

Further, as shown in FIG. 3, the engaging groove 150 is a V-shaped groove. The V-shaped groove includes a first groove wall 151 and a second groove wall 152 that are arranged in a V shape. The engaging protrusion 320 is an arc-shaped protrusion capable of being tangent to the groove walls of the V-shaped groove. That is, a cross-sectional shape of the engaging groove 150 perpendicular to the first rod 100 is V-shaped, and a cross-sectional shape of the engaging protrusion 320 perpendicular to the third rod 200 is arc-shaped. In this way, when the first rod 100 rotates to be engaged and fixed to the third rod 200, the engaging protrusion 320 can be more smoothly engaged into the engaging groove 150. When the fixing between the first rod 100 and the third rod 200 is released, the engaging protrusion 320 can also be easily rotated out from the engaging groove 150. Optionally, a first included angle between the first groove wall 151 and a plane where an opening of the V-shaped groove is located is in a range from 40° to 50°. In this embodiment, the first included angle is 45°. A second included angle between the second groove wall 152 and the plane where the opening of the V-shaped groove is located is in a range from 40° to 50°. In this embodiment, the second included angle is 45°. A height of the arc-shaped protrusion is in a range from 1.5 mm to 2.5 mm. In this embodiment, the height is 2 mm. The above configuration can prevent the first rod 100 from pivoting when the locking mechanism 400 is unintentionally released, without affecting the realization of the foldable function of the movable carrier.

Further, the engaging protrusion 320 is a serrated protrusion including at least two engaging teeth, and the engaging groove 150 is a serrated groove including at least two engaging grooves. The at least two engaging teeth can mate with the at least two engaging grooves one by one. Compared with the mating between the single protrusion and the groove, the mating structure of the serrated protrusion and the serrated groove can provide a larger friction force, so that the first rod 100 has a stronger anti-pivoting ability during the unintentional release. Certainly, under the condition of the same required anti-pivoting ability, the height of the serrated protrusion can be less than that of the single protrusion, and the depth of the corresponding engaging groove 150 can also be less than that of the single groove.

In another embodiment, the first mating portion 101 may be a plug hole, and the second mating portion 301 may be a plug pin capable of being plugged into the plug hole. In this way, when the locking mechanism 400 is unintentionally unlocked, since the plug pin of the first rod 100 is plugged into the plug hole of the second rod 300, the first rod 100 is not easy to pivot under the action of external force or its own gravity, so that it is convenient to restore the locking mechanism 400 to the locked state again, and thus the foldable and movable carrier 10 can be relocked and refixed. When the movable carrier needs to be folded, it is only necessary to apply a certain external force to the first rod 100 to make the plug pin rotate out from the plug hole, which ensures the foldable function of the foldable and movable carrier. It can be understood that the first mating portion 101 can also be a plug pin, and the second mating portion 301 can also be a plug hole capable of being plugged with the plug pin.

Further, a hole wall of the plug hole can be elastically deformed. When the hole wall of the plug hole is elastically deformed, an inner diameter of the plug hole is greater than a diameter of the plug pin. When the hole wall of the plug hole is restored to its original shape, the inner diameter of the plug hole is less than the diameter of the plug pin. Or, the plug pin can be elastically deformed. When the plug pin is elastically deformed, the diameter of the plug pin is less than the inner diameter of the plug hole; and when the plug pin is restored to its original state, the diameter of the plug pin is greater than the inner diameter of the plug hole. On the one hand, this configuration facilitates the plug pin plugging into the plug hole, and keeping the plug pin stably in the plug hole without easily coming out of the plug hole; and on the other hand, this configuration is also convenient for the plug pin to come out from the plug hole when external force is applied.

Optionally, both the first rod 100 and the second rod 300 are made of deformable plastic materials, so as to facilitate the mating and separation of the first mating portion 101 and the second mating portion 301.

The above-mentioned foldable and movable carrier 10 at least have the following technical effects.

When the locking mechanism 400 is unintentionally unlocked, since the first mating portion 101 and the second mating portion 301 are in a mating state, the first rod 100 pivotally connected to the second rod 300 is not easy to pivot, so that the user can reset the locking mechanism 400, and thus the movable carrier can be restored to the locked and fixed state, and as a result, the safety of the entire movable carrier can be improved. In addition, when it is really necessary to release the locking, the locking mechanism 400 can be pressed, and the first mating portion 101 and the second mating portion 301 can be released from the mating, for example, by applying a certain external force, so that the first rod 100 can rotate and be folded relative to the second rod 300, to ensure the realization of the foldable function of the movable carrier.

The technical features of the above-described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements falls in the protection scope of the present disclosure. Therefore, the protection scope of the present disclosure shall be subject to the appended claims.

What is claimed is:

1. A foldable and movable carrier, comprising:
   a locking mechanism having a locked state and an unlocked state;
   a first rod provided with a first mating portion; and
   a second rod pivotally connected to the first rod, and the second rod being provided with a second mating portion detachably mating with the first mating portion;
   wherein when the locking mechanism is in the locked state, the first rod and the second rod are relatively fixed; when the locking mechanism is in the unlocked state, if the first mating portion mates with the second mating portion, the first rod and the second rod are relatively fixed, if the first mating portion and the second mating portion are released from mating, the first rod is capable of rotating relative to the second rod, so as to fold or unfold the movable carrier.

2. The foldable and movable carrier according to claim 1, wherein the first mating portion is a male connecting portion, and the second mating portion is a female connecting portion capable of detachably mating with the male connecting portion; or, the first mating portion is a female connecting portion, and the second mating portion is a male connecting portion capable of detachably mating with the female connecting portion.

3. The foldable and movable carrier according to claim 2, wherein the one of the first mating portion and the second mating portion is a plug hole; and another one of the first mating portion and the second mating portion is a plug pin capable of being plugged into the plug hole.

4. The foldable and movable carrier according to claim 3, wherein a hole wall of the plug hole is capable of being elastically deformed; when the hole wall of the plug hole is elastically deformed, an inner diameter of the plug hole is greater than a diameter of the plug pin; when the hole wall of the plug hole is restored to its original shape, the inner diameter of the plug hole is less than the diameter of the plug pin; or
   the plug pin is capable of being elastically deformed; when the plug pin is elastically deformed, a diameter of the plug pin is less than an inner diameter of the plug hole; and
   when the plug pin is restored to its original state, the diameter of the plug pin is greater than the inner diameter of the plug hole.

5. The foldable and movable carrier according to claim 1, wherein one of the first mating portion and the second mating portion is an engaging groove; another one of the first mating portion and the second mating portion is an engaging protrusion capable of being engaged with the engaging groove.

6. The foldable and movable carrier according to claim 5, wherein the engaging groove is a V-shaped groove; the V-shaped groove comprises a first groove wall and a second groove wall that are arranged in a V shape; and the engaging protrusion is an arc-shaped protrusion capable of being tangent to the first groove wall and the second groove wall.

7. The foldable and movable carrier according to claim 6, wherein an included angle between the first groove wall and a plane where an opening of the V-shaped groove is located is in a range from 40° to 50°; an included angle between the second groove wall and the plane where the opening of the V-shaped groove is located is in a range from 40° to 50°; and a height of the arc-shaped protrusion is in a range from 1.5 mm to 2.5 mm.

8. The foldable and movable carrier according to claim 5, wherein the engaging protrusion is a serrated protrusion comprising at least two engaging teeth; the engaging groove is a serrated groove comprising at least two engaging grooves; and the at least two engaging teeth are capable of mating with the at least two engaging grooves one by one.

9. The foldable and movable carrier according to claim 1, further comprising a third rod; and wherein the first rod comprises a first position, a second position, and a third position that are sequentially spaced apart in an extending direction of the first rod; the first mating portion is disposed in the third position; the third rod is pivotally connected to the first rod in the first position through the locking mechanism; when the locking mechanism is in the locked state, the first rod and the third rod are relatively fixed; when the locking mechanism is in the unlocked state, the first rod is capable of rotating relative to the third rod, so as to fold or unfold the movable carrier; and the second rod is pivotally connected to the first rod in the second position.

10. The foldable and movable carrier according to claim 9, wherein an end of the first rod is provided with a first rotating sector, an end of the second rod is provided with a second rotating sector; the first rotating sector is opposite to the second rotating sector; the second position is disposed at a circle center of the first rotating sector; a circle center of the second rotating sector is pivotally connected to the first rotating sector in the second position; the first mating portion is disposed at a circumferential edge of a surface of the first rotating sector facing the second rotating sector; the second mating portion is disposed at a circumferential edge of a surface of the second rotating sector facing the first rotating sector.

11. The foldable and movable carrier according to claim 10, wherein a stopper is disposed on a side of the second rotating sector close to the third rod; when the first rod and the second rod are relatively fixed, the first rotating sector abuts against the stopper.

12. The foldable and movable carrier according to claim 11, wherein the stopper is a stopping slope disposed at the circumferential edge of the surface of the second rotating sector facing the first rotating sector.

13. The foldable and movable carrier according to claim 12, wherein the stopping slope is gradually raised in a direction of approaching the third rod.

14. The foldable and movable carrier according to claim 10, wherein one of the surface of the first rotating sector facing the second rotating sector and the surface of the second rotating sector facing the first rotating sector is provided with an arc-shaped guiding groove; another of the surface of the first rotating sector facing the second rotating sector and the surface of the second rotating sector facing the first rotating sector is provided with an arc-shaped guiding rib;
the arc-shaped guiding rib mates with the arc-shaped guiding groove in one-to-one correspondence, to guide rotations of the first rod and the second rod.

15. The foldable and movable carrier according to claim 14, wherein the arc-shaped guiding groove is concentric with the one of the first rotating sector and the second rotating sector; and the arc-shaped guiding rib is concentric with the other of the first rotating sector and the second rotating sector.

16. The foldable and movable carrier according to claim 15, wherein at least two arc-shaped guiding grooves are provided on the one of the surface of the first rotating sector facing the second rotating sector and the surface of the second rotating sector facing the first rotating sector, and at least two arc-shaped guiding ribs are provided on the other of the surface of the first rotating sector facing the second rotating sector and the surface of the second rotating sector facing the first rotating sector.

17. The foldable and movable carrier according to claim 9, wherein the locking mechanism comprises:
a first locking shell fixed on the first rod and comprising a first locking groove;
a second locking shell fixed on the third rod and comprising a second locking groove;
a locking member comprising at least two locking teeth arranged at a predetermined angle, and wherein shapes of the first locking groove and the second locking groove are adapted to a shape of the locking member, the locking member has a locked state and an unlocked state; when the locking member is in the locked state, the locking member is arranged in both the first locking shell and the second locking shell to limit a rotation of the second locking shell relative to the first locking shell; when the locking member is in the unlocked state, the locking member is withdrawn from the first locking groove or the second locking groove to allow the second locking shell to rotate relative to the first locking shell;
an elastic member operably connected to the locking member, so as to maintain the locking member in the locked state; and
a releasing member operably connected to the locking member, so as to drive the locking member to move against elastic force of the elastic member to switch the locking member from the locked state to the unlocked state.

18. The foldable and movable carrier according to claim 9, wherein an end of the first rod is provided with a first rotating sector, an end of the second rod is provided with a second rotating sector; the first rotating sector is opposite to the second rotating sector;
the second position is disposed at a circle center of the first rotating sector; a circle center of the second rotating sector is pivotally connected to the first rotating sector in the second position;
the first mating portion is disposed on a surface of the first rotating sector facing the second rotating sector, and disposed closer to the circle center of the first rotating sector than a circumferential edge of the first rotating sector;
the second mating portion is disposed on a surface of the second rotating sector facing the first rotating sector, and disposed closer to the circle center of the second rotating sector than a circumferential edge of the second rotating sector.

19. A foldable and movable carrier, comprising:
a locking mechanism having a locked state and an unlocked state;
a first rod provided with a first mating portion;
a second rod pivotally connected to the first rod, and the second rod being provided with a second mating portion detachably mating with the first mating portion; and
a third rod pivotally connected to the first rod through the locking mechanism, wherein when the locking mechanism is in the locked state, the first rod, the second rod, and the third rod are relatively fixed; when the locking mechanism is in the unlocked state, in responding to the first mating portion mating with the second mating portion, the first rod, the second rod, and the third rod are relatively fixed, in responding to the first mating portion and the second mating portion being releasing from mating, the first rod is capable of rotating relative to the second rod and the third rod, so as to fold or unfold the movable carrier.

20. The foldable and movable carrier according to claim 19, wherein the locking mechanism is spaced apart from the second rod.

\* \* \* \* \*